United States Patent
Hofer et al.

(10) Patent No.: US 10,571,116 B2
(45) Date of Patent: Feb. 25, 2020

(54) ILLUMINATED CERAMIC TILE AND PRODUCTION METHOD

(71) Applicants: Robert Hofer, St. Ruprecht/Raab (AT); Dieter Christandl, Weiz (AT); Josef Christandl, St. Ruprecht/Raab (AT)

(72) Inventors: Robert Hofer, St. Ruprecht/Raab (AT); Dieter Christandl, Weiz (AT); Josef Christandl, St. Ruprecht/Raab (AT); Alexander Haider, Vienna (AT); Oliver Fischer, Hard (AT)

(73) Assignees: Robert Hofer, St. Ruprecht/Raab (AT); Dieter Christandl, Weiz (AT); Josef Christandl, St. Ruprecht/Raab (AT)

( * ) Notice: Subject to any disclaimer, the term of this patent is extended or adjusted under 35 U.S.C. 154(b) by 0 days.

(21) Appl. No.: 15/764,654

(22) PCT Filed: Sep. 26, 2016

(86) PCT No.: PCT/EP2016/001601
§ 371 (c)(1),
(2) Date: Mar. 29, 2018

(87) PCT Pub. No.: WO2017/054918
PCT Pub. Date: Apr. 6, 2017

(65) Prior Publication Data
US 2018/0292080 A1    Oct. 11, 2018

(30) Foreign Application Priority Data
Sep. 29, 2015    (DE) .................... 20 2015 006 801 U

(51) Int. Cl.
*F21V 33/00*    (2006.01)
*E04F 13/14*    (2006.01)
(Continued)

(52) U.S. Cl.
CPC .............. *F21V 33/006* (2013.01); *E04B 5/46* (2013.01); *E04F 15/08* (2013.01); *G02B 6/0095* (2013.01); *E04F 2290/026* (2013.01)

(58) Field of Classification Search
CPC ...... E04F 15/08; E04F 2290/026; E04B 5/46; G02B 6/0095
See application file for complete search history.

(56) References Cited

U.S. PATENT DOCUMENTS 5,095,412 A  *  3/1992  French ................... E04C 2/521
                                                      362/153
8,021,014 B2     9/2011  Jacobsson
(Continued)

FOREIGN PATENT DOCUMENTS

AU     2007278700 A1    1/2008
DE       29511741 U1    11/1996
(Continued)

OTHER PUBLICATIONS

JP10-203883 A, machine translation dated May 2, 2019 (Year: 2019).*

*Primary Examiner* — Mariceli Santiago
(74) *Attorney, Agent, or Firm* — Browdy and Neimark, PLLC

(57) ABSTRACT

The invention relates to a ceramic tile (1) with a glaze (11) which covers at least the visible face (10). A light generated by one or more light sources (6, 14) is visible on the visible face (10), and at least one bore (2) and/or recess (22) passes through the body of the ceramic tile (1). The glaze (11) is designed to guide light and at least partly fills the bore (2) and/or the recess (22) in a sealing manner, and the one or more light sources (6, 14) are arranged on the rear face of the ceramic tile (1) and are connected to the bore (2) and/or the recess (22) so as to guide light.

7 Claims, 2 Drawing Sheets

(51) Int. Cl.
  *E04B 5/46*     (2006.01)
  *E04F 15/08*    (2006.01)
  *F21V 8/00*     (2006.01)
  *F21Y 105/00*   (2016.01)

(56) References Cited

U.S. PATENT DOCUMENTS

| | | | |
|---|---|---|---|
| 8,998,469 B1* | 4/2015 | Miller | F21V 33/006 362/554 |
| 2003/0077417 A1* | 4/2003 | Hasecke | E04F 13/0871 428/67 |
| 2007/0159814 A1* | 7/2007 | Jacobsson | E04F 15/02 362/153 |
| 2008/0019121 A1* | 1/2008 | Ly | F21V 33/006 362/145 |
| 2009/0116241 A1* | 5/2009 | Ashoff | F21V 33/006 362/253 |
| 2014/0340897 A1* | 11/2014 | Thijssen | F21V 33/006 362/235 |
| 2016/0017613 A1* | 1/2016 | Nelson | E04G 21/00 362/145 |

FOREIGN PATENT DOCUMENTS

| | | | |
|---|---|---|---|
| DE | 202004000810 U1 | 4/2004 | |
| DE | 202005000714 U1 * | 5/2005 | E04C 1/39 |
| DE | 602004000663 T2 | 5/2007 | |
| DE | 102007046873 A1 * | 4/2008 | F21V 33/006 |
| DE | 102007046873 A1 | 4/2008 | |
| DE | 202009016078 U1 | 2/2011 | |
| DE | 1021007325 A1 | 8/2011 | |
| EP | 2053031 A1 * | 4/2009 | B28B 1/005 |
| FR | 1345842 A | 12/1963 | |
| JP | 10203883 A * | 8/1998 | |

* cited by examiner

ILLUMINATED CERAMIC TILE AND PRODUCTION METHOD

The invention relates to a ceramic tile according to the preamble of claim 1 and a method for producing same.

According to the invention, the term "ceramic tile" is understood to refer to ceramic slabs that are used to line walls and as floor coverings in the indoor and outdoor areas.

The term "tile" is also used for natural stone, glass, floor coverings, etc., to classify parts having a similar shape. The bisque (body) of such a ceramic tile is preferably made of clay minerals, consisting primarily of extremely fine-grained weathering products of feldspar formed with a wide variety of admixtures. The composition of the clay, the preparation and the firing determine the color of the unglazed piece.

Clay is thus the main ingredient used as the basic material for the ceramic tiles. Depending on the application, mixtures of various clay samples are used for this purpose. In addition to clay, other mineral raw materials are also used in a recipe for a ceramic. The most important additives are quartz, kaolin and feldspar. Depending on the intended purpose, calcite, dolomites, fluorspar or refractory clay are also added.

The extrusion process and powder pressing (also known as dry pressing) are used in modern ceramic production. In the extrusion process, a continuous strip is produced as a single tile or double tile from a plastic ceramic composition and then divided into tile size. In the dry pressing method, specially prepared ceramic powder is pressed into molds under a high pressure and then fired.

A third method uses roller presses for large-format fine tiles. A basic ceramic material is pressed between two rollers moving axially.

The present invention therefore relates to an illuminated ceramic tile produced according to one or more of the aforementioned methods.

There have been various attempts in the prior art to provide illumination for ceramic tile. For example, DE 20 2009 016 078 U1 proposes that one or more light sources may be arranged in a transparent cover layer above the body of a ceramic tile, such that this cover layer is made of a transparent plastic slab in which the lighting elements are embedded. However, the disadvantage of this arrangement is that the character of the ceramic tile, namely its highly load-bearing surface, its abrasion resistance, its impact hardness and other preferred properties are lost as a result of the arrangement of an illumination layer on the visible face.

DE 20 2004 000 810 U1 proposes an illuminated tile made of glass, in which the tile slab is formed as a sheet of glass and, with a spacer, has a light source carrier on which numerous light-emitting diodes are arranged. Therefore, a sheet of glass, which alters the original physical properties of the ceramic tile in an unwanted manner, is also arranged above the ceramic tile.

DE 295 11 741 U1 describes a ceramic tile, into which several cutouts or passages for insertion elements are incorporated. The disadvantage of such a ceramic tile is that the cutouts or passages must be created after the ceramic tile has been completed, which is a disadvantage associated with a high mechanical investment and leading to a high reject rate. Providing a completely fired ceramic slab with cutouts is associated with a high complexity in terms of tools and processing effort, and there is also the risk of breakage during processing.

Therefore, against the background of DE 295 11 741 U1, the object of the present invention is to improve upon an illuminated ceramic tile in such a way that it can be produced with little effort and retains the physical properties of a ceramic surface at least on the visible face.

To achieve the object as formulated, the invention is characterized by the technical teaching of claim 1.

The ceramic tile according to the present invention proposes that at least one glaze covering the visible face is provided, and a light generated by one or more light sources is visible on the visible face.

Accordingly, a densely fired ceramic tile is provided in both the prior art and in the present invention.

The glaze serves as a surface finish for ceramic products, such as stoneware, earthenware and porcelain and, in contrast with the porous crystalline body, creates a closed surface layer with a vitreous finish.

Stoneware and clay pieces are densely fired at a firing temperature of 1250° C. or more. Porcelain is densely fired at temperatures up to 1400° C. This results in intercrystalline vitreous phases, which supply a closed porosity and possibly also a self-glaze. The glaze is formed by additional substances, with which a hard closed surface layer can be produced in various colors. The components of the glaze form a vitreous layer from a mixture of various oxides with one another and with the base material.

Accordingly, the invention is directed at a fired ceramic tile, and it has been recognized according to the invention that, at the time of its production, the body of the ceramic tile may already be permeated by a plurality of bores or recesses, which form the future light-emitting openings on the visible face.

Thus, if the unfired clay piece is obtained in production of ceramic tiles, while still in the raw state, i.e., after production by the extrusion process or by the powder pressing method or the roll pressing method, it is provided according to the present invention that a number of bores and/or recesses are introduced into the body of the ceramic tile of this unfired material, which is still soft, passing through the body, i.e., extending from the visible face all the way through to the back face of the body of the tile.

Such holes or slots in the unfired tile, which is still soft, can be created, for example, by a nail plate, by a knife plate or by punching tools, which create the desired punched-out areas, bores or recesses in the unfired body of the ceramic tile while it is still soft.

After creating the bores, recesses or slots passing through the body of the ceramic tile, the ceramic tile is processed further by essentially known methods. It is thus coated with a liquid glaze and fired to form a dense piece.

It is assumed here that the glaze covering at least the visible face will flow into the bores, recesses or slots created previously in the body of the ceramic tile during the firing operation—or even prior to that—and will fill up these bores, recesses or slots.

Furthermore, it is provided that the glaze used is at least partially light conducting, transparent or opaque and enables the passage of visible light.

After the final firing of the ceramic tile thus provided with holes, slots or other recesses, the recesses created previously are thus filled with the light-conducting glaze.

According to the invention, it is then provided that one or more light sources are arranged on the back face of the ceramic tile and are arranged in light-conducting connection to the bores, slots or recesses.

It is thus sufficient to arrange one or more light sources on the back face of the ceramic tile to illuminate the back face of the ceramic tile, because the bores, slots or other recesses, which were previously filled with the light-conducting glaze, will now transport the light generated on the back face to the visible face of the ceramic tile and make it visible there.

The ceramic tile thus provides light on the visible face because the light emerges from the bores, slots or recesses and is readily discernible.

It is possible to provide that the glaze is transparent like glass and uncolored so as to achieve a high luminous density on the visible face of the ceramic tile.

In other embodiments, it is also possible to provide that the glaze is pigmented, and there are various possibilities for this pigmentation:
1. The glaze may have an opaque pigmentation, which weakens the light conduction through the body of the ceramic tile.
2. The glaze may be pigmented by additives in any desired manner, so that the light impression on the visible face is determined by the color of the glaze used.
3. In another embodiment, two-step firing methods may also be used, such that a glaze that fills only the bores, recesses or slots is used in a first firing operation, and this glaze may be formed in a color, for example. After completion of the first firing operation, the visible face of the ceramic tile is then covered with a second layer of glaze and fired again.

Various layers of glaze can be created in this way, one above the other.

In another embodiment of the invention, it is possible to provide that the ceramic tiles are perforated, slotted or provided with other recesses in the green state, and these holes, slots or recesses are then filled with suitable place-holders while the glaze is applied, and thereby kept free for the subsequent firing operation.

After the final firing of the piece, the bores, slots or recesses that had been created are thus free of the glaze on the surface and can then subsequently be filled with another composition, preferably made of a plastic that hardens by curing.

The bores, slots or recesses are then filled with a different light-conducting plastic material in comparison with the hardened glaze covering the other surfaces of the ceramic tile.

In one preferred embodiment of the invention, it is provided that the light source is embodied as a lighting tile, which is fitted into a respective bottom recess on the back face of the ceramic tile as a surface lighting element. Such a lighting tile may be furnished with light sources, for example, on the edge side or at least on the edges, that create a uniform luminous impression over the entire surface of the lighting tile.

The lighting tile may also be designed as an electrically activatable fluorescent or luminescent sheet.

Instead of a lighting tile covering the surface, individual lighting elements such as LEDs distributed discretely may also be used, in which case it is preferable if such discrete lighting elements are attached to the back face of the ceramic tile, so that they are flush and are attached to the back face of the ceramic tile, opposite the respective bore or recess, to thereby shine their light directly into the bore.

In another embodiment, it may also be provided that the individual discrete, point-type lighting elements are connected electrically to one another to form a chain as a lighting strip, and such lighting strips are then attached to the back face of the ceramic tile in the respective recesses.

A method directed at production of an illuminated tile is based on the fact that, in a first method step, the unfired ceramic tile comprising a blank in a moist and moldable raw state containing an earth-moist clay mixture and some other mineral additives is subjected to an extrusion or roll-forming process, and then numerous bores and/or recesses are created in the body of the ceramic tile while in the form of unfired earth-moist extruded material, which is molded in the form of a slab, these bores and/or recesses passing completely through the body, i.e., extending from the visible face to the back face of the body of the tile, and next the bores and/or recesses are filled and closed with a glaze that is at least partially light conducting, and only then does the firing operation take place, converting the tile to a dense ceramic piece.

In a preferred embodiment of the method, the holes or slots in the unfired tile, which is still soft, are created by a nail plate or a knife plate or punching tools, which create the bores or recesses or punched-out areas in the body of the ceramic tile, while it is still soft and unfired.

The subject matter of the present invention is derived not only from the subject matter of the individual claims but also from the combination of the individual claims with one another.

All the information and features disclosed in these documents, including the abstract, in particular the three-dimensional design, as illustrated in the drawings, are claimed as essential to the invention inasmuch as they are novel individually or in combination in comparison with the prior art.

The invention is explained in greater detail below on the basis of several drawings illustrating methods of implementation. Additional features that are essential to the invention and advantages of the invention are derived from the drawings and the description thereof, in which.

Figure 1:
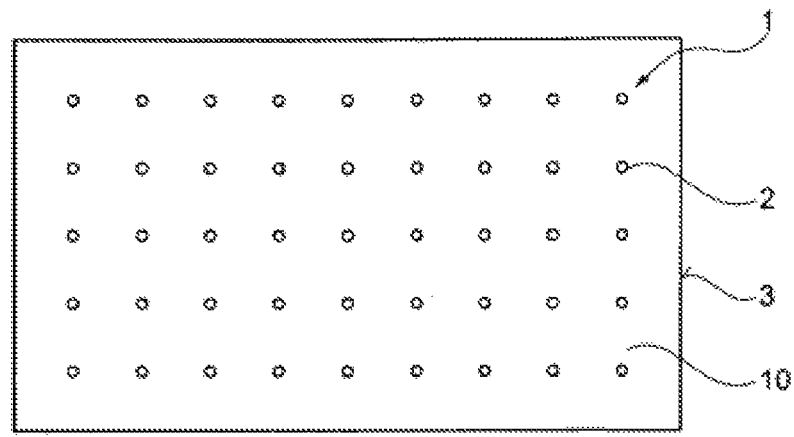
FIG. 1 shows schematically a top view of a ceramic tile in the finished condition.
Figure 2:
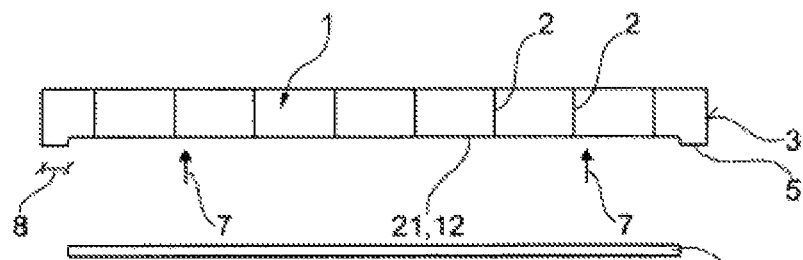
FIG. 2 shows a section through the ceramic tile according to FIG. 1, illustrating the installation of a lighting tile.
Figure 3:
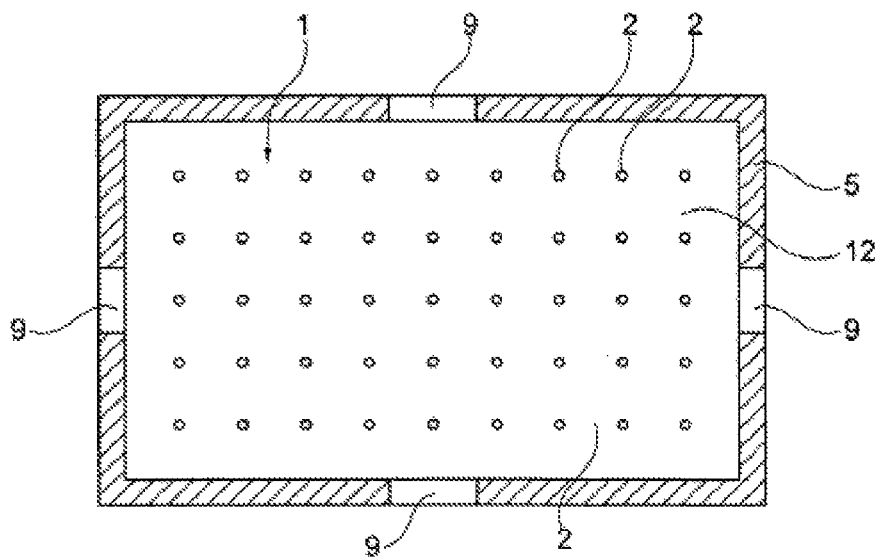
FIG. 3 shows a top view of the back face of the ceramic tile according to FIGS. 1 and 2.

According to FIGS. 1 to 3, the ceramic tile 1 consists of a ceramic body having a plurality of bores 2, which form light-conducting openings in the range of approx. 0.5 to 5 mm diameter in the embodiment illustrated here. They may be distributed regularly or irregularly over the visible face 10 of the ceramic tile 1 and pass through the entire body of the ceramic tile 1, as illustrated in FIG. 2.

In preferred embodiments, the ceramic tile 1 has a total thickness in the range of approx. 15 to 20 mm, and the peripheral bottom edge 5 has a width in the range of approx. 10 to 20 mm.

The height of the bottom edge 5 over the bottom recess 4, which is recessed deeper, may be in the range of approx. 4 mm.

In FIGS. 1 to 3, it is provided that the ceramic tile 1 is finished and at least the visible face 10 and also at least the peripheral edge sides 3 are covered with a vitreous glaze 11.

However, it is also possible to provide that the bottom recess 4 and the bottom edge 5 are covered with the vitreous glaze 11 and fired.

To produce an illuminated ceramic tile, it is therefore provided that, according to FIG. 2, a flat lighting tile 6 is introduced into the recess 4 in the bottom recess in the direction of arrow 7 and is secured there with fastening means that are not shown in detail. Such fastening means may be clamping means, but they may also be adhesive means and clamping means.

The area of the lighting tile 6 should be selected so that it does not protrude beyond the width 8 of the peripheral bottom edge 5 but instead can be fitted so that it is flush in the bottom recess 4.

FIG. 3 shows that the peripheral bottom edge 5 may also have recesses 9 at the side. The power supply for the lighting elements of the lighting tile 6 can be passed through these recesses 9. It is likewise possible to arrange the lighting elements themselves in the area of these recesses, so that they then illuminate the lighting tile 6 from the edge side and thus create a continuous flat lighting impression of the lighting tile 6.

FIG. 3 shows that the bores 2 illustrated here as an example can extend into the bottom side 12 of the ceramic tile 1, so that the bores 2 pass through the body of the ceramic tile 1.

Figure 4:
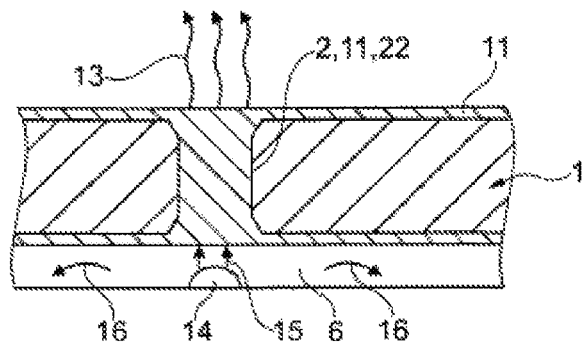
FIG. 4 shows an enlarged section through a light-guiding bore in the ceramic tile according to FIGS. 1 and 3.

FIG. 4 shows schematically the finished fired ceramic tile 1, where it can be seen that the glaze 11 has run into the bore 2 in the ceramic tile 1, so that it fills the hole after the firing operation and the bore 2 is filled and sealed completely.

This ensures that, when the ceramic tile is used, its properties are maintained, i.e., a highly abrasion resistant surface with a high resistance to breaking and a high hardness, as would be expected of unlighted ceramic tiles 1.

FIG. 4 also shows that, instead of the lighting tile 6, discrete lighting elements 14 can now also be arranged in such a way that they are flush and opposite one another at each bore 2. The discrete lighting elements may also generate a colored light.

Light generated in this way is emitted in the direction of arrow 15 into the bore 2 and is also distributed in the direction of arrow 16 on the bottom side of the ceramic tile 1 and may propagate in these directions of arrows 15, 16 in the lighting tile 6.

Figure 5:
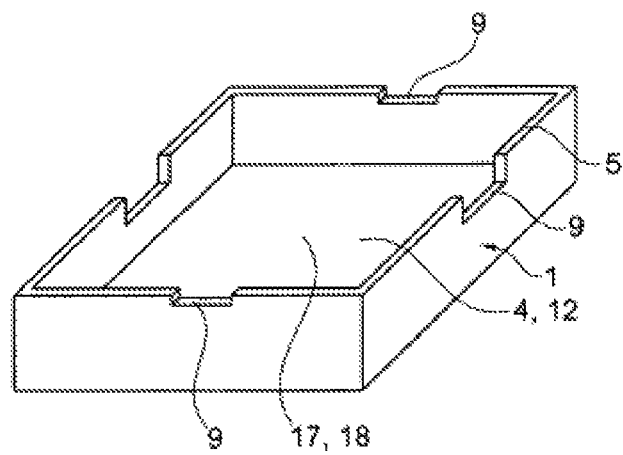
FIG. 5 shows schematically the rear view of the ceramic tile according to FIGS. 1 through 3 in a perspective view (simplified in the drawing)

FIG. 5 shows, in highly schematic form, the arrangement when individual lighting elements 14 are arranged so that they are distributed in the manner of lighting strips 17 in the bottom recess 4 in the ceramic tile 1. The recesses 9 arranged on the edge side pass through each.

They may also be arranged crosswise, so that the recesses 9 arranged opposite one another may also have an additional lighting strip 17 passing through them.

It is likewise possible to have a power cable 18 passing through the recesses 9 in order to electrically connect the ceramic tiles 1 situated side by side to one another by means of suitable cables.

Figure 6:
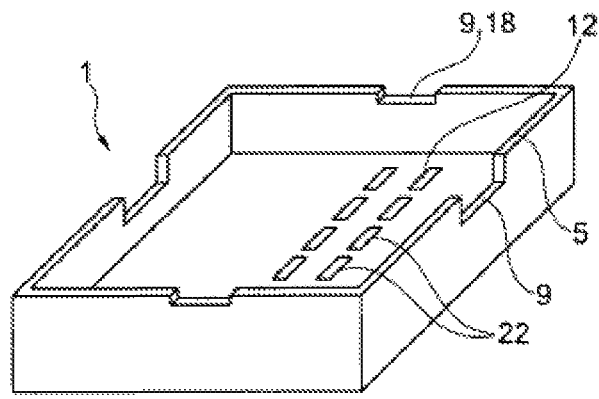
FIG. 6 shows an embodiment that is modified in comparison with FIG. 5.

In modification of the embodiments shown previously, FIG. 6 shows that, instead of the bores 2, recesses 22 of any shape may also be arranged in the body of ceramic tile 1.

In the embodiment shown here, these recesses 22 are designed in the form of slots.

The rays of light 13 generated by the lighting sources in this way (see FIG. 4) are also readily discernible from the visible face 10 and may even extend through the glaze 11, so that they conduct light, and the glaze 11, thanks to its vitreous structure, may also be used as a light conductor, so that an extensive light impression is obtained on the visible face 10 of the ceramic tile 1.

LEGEND TO DRAWINGS

1 Ceramic tile
2 Bore
3 Edge side
4 Bottom recess
5 Bottom edge
6 Lighting tile
7 Direction of arrow
8 Width (of 5)
9 Recess (in 5)
10 Visible face
11 Glaze
12 Bottom side
13 Light beam
14 Lighting element
15 Direction of arrow
16 Direction of arrow
17 Lighting strip
18 Power cable
19
20
21
22 Recess

The invention claimed is:

1. A ceramic tile comprising:
   a casting compound covering at least a visible face of the ceramic tile, wherein the casting compound is opaque or transparent,
   at least one bore and/or slot passing through said ceramic tile,
   one or more light sources arranged such that light is visible on a visible face of the ceramic tile,
   wherein the casting compound is a light-conducting glaze,
   wherein the at least one bore and/or slot is/are filled and sealed,
   wherein the one or more light sources are arranged on a back face of the ceramic tile opposite to the visible face and are connected to the at least one bore and/or slot to conduct light,
   wherein the light source is a lighting tile,
   wherein a recess is defined in the back face of the ceramic tile and the lighting tile is arranged in the recess, and
   wherein the recess is defined by an elevated peripheral bottom edge, in which one or more side recesses are defined.

2. The ceramic tile according to claim 1, wherein the ceramic tile in a raw state thereof before firing has the at least one bore and/or slot.

3. The ceramic tile according to claim 1, wherein the one or more light sources are spot lighting elements comprising LEDs and/or OLEDs and/or fluorescent elements.

4. The ceramic tile according to claim 1, wherein the one or more light sources comprise lighting strips arranged on the back side in the recess.

5. The ceramic tile according to claim 1, wherein the light-conducting glaze is a densely fired, vitreous layer or a curable plastic composition.

6. A method for producing a ceramic tile, comprising:
   subjecting an unfired ceramic tile consisting of a blank in a moist and moldable raw condition, containing a clay mixture that is at least earth-moist and also containing other mineral additives, to an extrusion process or a roll-forming process, and
   providing the unfired ceramic tile with a glaze, and
   subjecting the glazed unfired ceramic tile to a firing operation, in which the ceramic tile is created as a dense clay piece, wherein at least one bore and/or slot is created in the unfired ceramic tile in the transition between the extrusion and the glazing steps, the at least one bore and/or slot extending from a visible face to a back face of the body of the ceramic tile, thereafter filling and closing the at least one bore and/or slot with a glaze that at least partially conducts light, and arranging one or more light sources on the back face of the ceramic tile and are connected to the at least one bore and/or slot in a light-conducting manner.

7. The method according to claim 6, wherein the at least one bore and/or slot is defined in the unfired ceramic tile, while it is still soft, by a nail plate or by a knife plate or by punching tools, which create punched-out areas defining the at least one bore and/or slot in the unfired body of the ceramic tile while still soft.

* * * * *